April 19, 1966 C. L. VICE 3,246,384

METHOD OF MAKING A TRANSDUCER

Filed April 25, 1961

INVENTOR:
Charles L. Vice

By Smyth, Roston & Pavitt
Attorneys

United States Patent Office 3,246,384

Patented Apr. 19, 1966

3,246,384

METHOD OF MAKING A TRANSDUCER

Charles L. Vice, Pasadena, Calif., assignor to General Instrument Corporation, Hawthorne, Calif., a corporation of New Jersey Filed Apr. 25, 1961, Ser. No. 105,506
14 Claims. (Cl. 29—155.5)

This invention relates to transducer heads and to methods of producing such heads. More particularly, the invention relates to magnetic heads for use at high frequencies to provide a transducing action between the head and a medium moving past the head. The invention also particularly relates to methods of producing such magnetic heads. The invention is especially concerned with the production of a stable gap to insure optimum operating conditions at high frequencies.

Magnetic heads have become the standard equipment for use to provide a transducing action between electrical equipment and a storage medium. For example, television signals are now recorded on a magnetic tape and magnetic heads are used as the transducers for recording the magnetic information on the tape and for subsequently reading the information from the tape. As another example, information representing the results of computation in a digital computer is recorded on magnetic tape or on a magnetic drum by the use of magnetic heads which are disposed in contiguous relationship to the tape or drum as the magnetic medium on the tape or drum moves past the head. This information is subsequently reproduced from the tape or drum by the magnetic heads.

As the electrical equipment such as the recorders and reproducers of television signals and the digital computers become refined, they become capable of operating at increased frequencies. The use of increased frequencies is desirable since it tends to minimize the amount of tape required to store a given amount of information and since it tends to increase the speed at which information can be processed such as by the digital computer. Although the frequency of operation of the electrical equipment such as the digital computer has become increased, it has been difficult to increase the frequency of response of the magnetic heads. The magnetic heads have therefore tended to be the weak link in the electrical equipment such as the digital computer so as to limit the frequency of operation of such electrical equipment.

Various attempts have been made to increase the frequency of response of magnetic heads into the range of megacycles and tens of megacycles. Such attempts have not been completely successful, primarily because it has been difficult to precisely control the dimensions of the gap in the heads. The gaps are disposed in contiguous relationship to the storage medium such as the tape or disc to provide a magnetic coupling between the storage medium and the magnetic heads.

The primary difficulty in maintaining the gaps precisely dimensioned in the magnetic heads now in use has resulted from the formation of the magnetic circuit in the head from laminations of magnetic material. It has been found that the laminations tend to shift in position so as to vary the dimensions of the gap. Such shifts in dimensions may result from vibrational shearing forces which may be inadvertently applied to the head. Most of these forces are the result of thermal expansion and contraction in the head structure as the head goes through environmental temperature cycles. The vibrations and shearing forces tend to produce slight shifts in the position of the laminations in the gap which deteriorates the playback of short recorded length signals (high frequencies). These slight shifts considerably influence the operating characteristics of the head.

This invention provides a head in which the dimensions of the gap are fixedly maintained in spite of vibrational and shearing forces to which the head may be subjected. The dimensions of the gap are fixedly maintained by bonding particular materials to the walls of the gap so that the bonded materials are able to withstand various forces such as those resulting from vibrational and shearing stresses. The bond is produced by depositing a layer of material such as gold to each of the two walls defining the gap in the head. A second material, such as indium, having a lower melting temperature than gold is then deposited on the gold layers. The second material has properties of forming an alloy with the first material when melted so as to produce a bond between the different layers in the gap.

Figure 5:
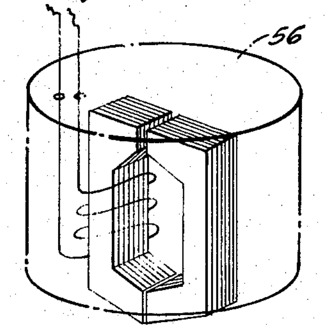
Figure 6:
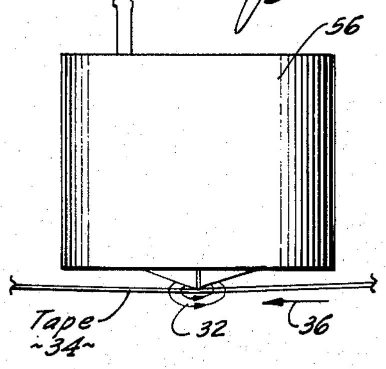

FIGURE 5 is a schematic perspective view of the head constituting this invention, the casing for the head being shown in broken lines to indicate the elements within the head in detail; and FIGURE 6 is a front elevational view of the head constituting this invention after the formation of the magnetic circuit shown in the previous figures, the head being disposed in contiguous relationship to a movable medium such as a tape.

Figure 1:
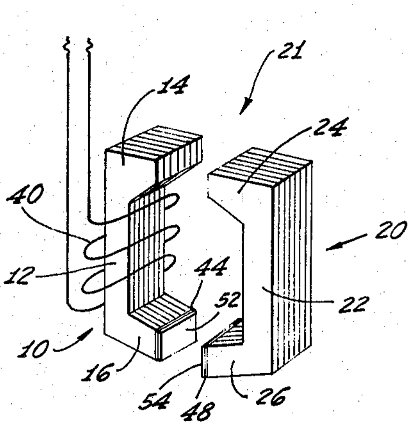
FIGURE 1 is an exploded perspective view of a magnetic circuit included in this invention at a preliminary stage in the fabrication of the magnetic circuit and further illustrates a winding on the magnetic circuit.
Figure 2:
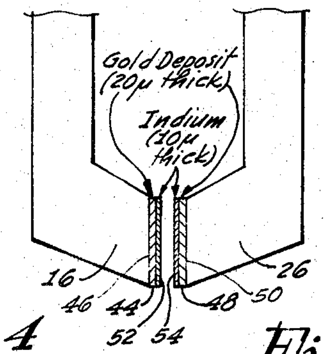
FIGURE 2 is an enlarged fragmentary sectional view of the magnetic circuit shown in FIGURE 1.
Figure 3:
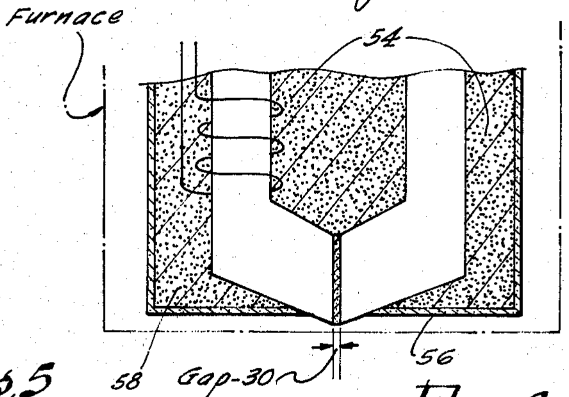
FIGURE 3 is an enlarged fragmentary sectional view of the magnetic circuit included in this invention, the magnetic circuit being disposed in a furnace as a step in the method of producing the magnetic circuit.
Figure 4:
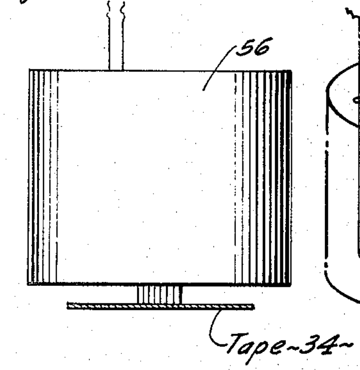
FIGURE 4 is a side elevational view of the head constituting this invention after the formation of the magnetic circuit shown in the previous figures, the head being disposed in contiguous relationship to a movable medium such as a tape.

As illustrated in FIGURE 1, the head constituting this invention and illustrated generally at 1 includes first laminations 10 made from a suitable material such as that designated by the trademake "Permalloy." The laminations 10 are provided with a U-shaped configuration having an integrating portion 12 and a pair of legs 14 and 16 extending from the opposite ends of the integrating portion 12. Laminations 20 are disposed relative to the laminations 10 to form a closed magnetic circuit with the laminations 10. The laminations 20 have a U-shaped configuration corresponding to that of the laminations 10. This U-shaped configuration is defined by an integrating portion 22 and by a pair of legs 24 and 26 extending from opposite ends of the portion 22. The legs 14 on the laminations 10 and the legs 24 on the laminations 20 are pressed against one another in the assembled relationship of the laminations so as to minimize any gap between the legs 14 and 24.

The laminations 10 and 20 are disposed in their assembled relationship to produce a gap 30 between the portions 16 and 26. This gap has a small width such as in the order of 60 micro-inches. Because of the gap 30, the magnetic flux traveling through the magnetic circuit formed by the laminations 10 and 20 tends to travel through a leakage path, as indicated at 32. As will be seen, the leakage path 32 does not extend directly across the gap 30. This causes the flux in the leakage path 32 to thread a magnetic medium such as a tape 34 which is disposed in contiguous relationship to the gap 30. Since the tape forms a magnetic shunt for this leakage path, the tape also operates to facilitate the passage of the leakage flux to the tape.

By providing a movement of the tape 34 in a direction indicated by an arrow 36, changes in the leakage flux 32 traveling between the head 22 and the tape 34 are produced at successive instants of time. When the changes in flux result from variations in the current passing through a winding 40 wound on the laminations 12 or the laminations 20 as shown in the drawings, corresponding magnetic information becomes recorded on the medium 34 for subsequent reproduction. At other times, information may have been previously recorded on the tape 34 such that the tape causes variable fluxes to be produced in the magnetic circuit formed by the laminations 10 and 20 as the tape moves past the head. These variable fluxes in turn cause variable electrical signals to be induced in the winding 40 for subsequent use. Although only the winding 40 is shown as being disposed on the leg 10, it will be appreciated that other windings may be included in the head constituting this invention. For example, a second winding may be disposed on the leg 20.

The head described above and shown in FIGURE 1 may be considered as conventional since the features constituting this invention have yet to be described in detail. However, in the conventional heads now in use, it has been difficult to control the dimensions of the gap 30 such that the dimensions are maintained with precise tolerances. The precise tolerances are important in view of the infinitesimal width of the gap, especially when high operating frequencies in the order of 5 to 10 megacycles or packing densities in the order of 10 to 15 kilocycles per linear inch are required. By way of example, it has been difficult to maintain precise dimensional tolerances in the gap when the gap has a thickness in the order of 60 micro-inches. The difficulty has resulted from the tendency of the laminations 10 to shift in position relative to the laminations 20, especially when the head is subjected to vibrational or shearing stresses.

The head constituting this invention is formed to maintain the dimensions of the gap 30 with precise tolerances. The tolerances in the gap 30 are maintained by depositing different material in the gap and by alloying such materials and bonding the materials to the walls defining the gap to produce a firm and unitary bond. By producing such a firm and unitary bond, the dimensions of the gap cannot change when the head becomes subjected to vibrational or shearing forces.

As a first step in the formation of the head constituting this invention, a layer 44 of a first material such as gold is deposited on walls 46 defining the extremities of the legs 16 of the laminations 10. Similar layers 48 are deposited on walls 50 defining the extremities of the legs 26 of the laminations 20. Each of the layers 44 and 48 may be deposited as by vacuum, electrical or electroless techniques and may be provided with a thickness in the order of 20 micro-inches.

The material forming the layers 44 and 48 preferably has a high melting temperature. For example, gold may be used as the layers 44 and 48 since gold has a melting temperature of approximately 1945° F. and has a boiling temperature in excess of 5,000° F. Gold is also desirable since it is a good electrical conductor, the volume resistivity of gold being only approximately 2.42 micro-ohms per centimeter at a temperature of approximately 70° F. Gold is also desirable since it tends to alloy with other materials such as indium when the indium becomes melted.

After the gold has been deposited to form the layers 44 and 48, a second material is respectively deposited on the layers 44 and 48 to form layers 52 and 54. Each of the layers 52 and 54 is preferably formed from a material having a lower melting temperature than that of the material forming the layers 44 and 48. The material forming the layers 52 and 54 is also provided with properties to form an alloy with the material in the layers 44 and 48 when the material in the layers 52 and 54 becomes melted. In effect, the material forming the layers 52 and 54 forms a eutectic with the layers 44 and 48 when the material forming the layers 52 and 54 becomes melted.

By way of illustration, indium may be used to form the layers 52 and 54 when gold is used to form the layers 44 and 48. Indium is desirable since it has a melting temperature of approximately 312° F. This melting temperature is quite low compared to the melting temperature of approximately 1945° F. for gold. Indium is also desirable since it is a good electrical conductor. For example, the volume resistivity of indium is only in the order of 8.4 micro-ohms per centimeter at a temperature of approximately 70° F . Another advantage of using indium is that it has a relatively high boiling temperature such as in the order of 2600° F. As will be seen, this boiling temperature is higher than the melting temperature of gold. The indium is deposited in each of the layers 52 and 54 to a thickness in the order of 7 to 10 micro-inches.

After the layers 52 and 54 of indium have been respectively deposited on the layers 44 and 48 of gold, the magnetic circuit is formed by arranging the laminations 10 and 20 as shown in FIGURE 1. The magnetic circuit is formed by pressing the laminations together so that the gap between the legs 14 and 24 is minimized and so that the layers 52 and 54 contact each other. The transducer head constituting this invention is then assembled in a casing 56. A potting compound 58 is subsequently inserted into the casing 56 to fill the portion of the casing not occupied by the transducing head. Various types of potting compounds may be used although an epoxy has been found to be quite satisfactory.

The casing 56 is then inserted in a furnace and is heated uniformly to a temperature of approximately 350° F. so that all of the components in the casing 56 become heated to the same temperature. At a temperature of approximately 350° F., the indium in the layers 52 and 54 melts so as to alloy with the gold in the layers 44 and 48 and form a eutetic. By forming an alloy between the layers 52 and 54 and the layers 44 and 48, the various layers become mechanically bonded to one another and to the walls defining the gap 30 between the laminations 10 and 20. The mechanical bond produced in the gap between the layers 44, 48, 52 and 54 is instrumental in preventing the laminations 10 from being separated from the laminations 20 or from being sheared relative to the laminations 20. In this way, the gap defined by the layers 44, 48, 52 and 54 is fixedly maintained regardless of any vibrational and shearing stresses to which the transducer head constituting this invention may be subsequently subjected.

The epoxy potting compound 58 has properties of reacting with catalysts in the compound at a temperature of approximately 350° F. to produce a strong solid. This solid is also instrumental in maintaining all of the components in the head constituting this invention in fixed relationship with one another since it tends to absorb or cushion any forces applied to the casing 56. The potting compound also has the properties when solidified of becoming stable with variations in temperature so as to facilitate the proper operation of the head constituting this invention at different temperatures.

The use of gold as the layers 44 and 48 and of indium as the layers 52 and 54 is advantageous since the two materials tend to react at a relatively low temperature such as 350° F. As will be seen, the indium and gold react at temperatures which are no greater than those to which the head is subjected in obtaining a reaction between the epoxy and the catalyst. This allows the alloy of gold and indium to be produced at the same time and at the same elevated temperature as the reaction of the epoxy and the catalyst to form the heat stable solid.

Since gold and indium are electrically conductive and have low volume resistivities, the alloy formed by the layers of gold and indium is also highly conductive. The high electrical conductivity of the alloy causes eddy currents to flow through the alloy when flux is produced in the magnetic circuit defined by the laminations 10 and 20 and the gap 30 between the laminations. The eddy currents in turn cause a magnetic flux to be produced in the gap 30 in a direction to oppose or buck the flux normally flowing through the magnetic circuit including the laminations 10 and 20 and the gap 30.

The bucking flux produced in the gap 30 by the eddy currents in the alloy inhibits the flow of flux directly through the gap 30 so that the production of leakage flux is facilitated. This leakage flux is desirable since it tends to thread the magnetic medium such as the tape 34 which is disposed in contiguous relationship to the gap 30. In this way, the magnetic coupling between the head 21 and the tape 34 is facilitated.

The head constituting this invention is able to operate at relatively high frequencies such as in the order of 5 to 10 megacycles or at high packing densities such as in the order of 10 to 15 kilocycles per linear inch. This results in part from the parameters chosen for the head including the relatively narrow dimensions of the gap 30. It also results in part from the fact that the dimensions of the gap 30 are fixedly maintained by producing a strong bond between the various layers in the gap and between such various layers and the laminations 10 and 20. High operating frequencies are also able to be obtained because of the use of highly conductive materials for the layers 44, 48, 52 and 54 in the gap 30.

Although this application has been disclosed and illustrated with reference to particular applications, the principles involved are susceptible of numerous other applications which will be apparent to persons skilled in the art. The invention is, therefore, to be limited only as indicated by the scope of the appended claims.

What is claimed is:

1. A method of producing a transducer head for providing a transducing action between the head and a movable medium, including the steps of:

providing first and second magnetic members to define a gap between the magnetic members upon a disposition of the magnetic members in contiguous relationship to each other to obtain a disposition of the gap in contiguous relationship to the movable medium, depositing a layer of a first material on each of the first and second magnetic members where the first layer has a first particular melting temperature, depositing a layer of a second material on the first material on each of the first and second magnetic members where the second material has a second particular melting temperature lower than the first particular melting temperature, disposing the first and second members in contiguous relationship to each other, and heating the first and second magnetic members and the first and second layers to a particular temperature greater than the second particular melting temperature but less than the first particular melting temperature with the magnetic members in contiguous relationship to one another to obtain an alloy of the first and second materials and a bonding of the first and second materials for the production of a continuous gap between the first and second materials.

2. A method of producing a transducer head for providing a transducing action between the head and a movable medium, including the steps of:

providing first and second magnetic members to define a gap in the magnetic members upon a disposition of the magnetic members in contiguous relationship to each other to obtain a disposition of the gap in contiguous relationship to the movable medium, wherein the gap is defined by the space between the first and second magnetic members.

depositing a first layer of a first material on the first magnetic member where the first material has a high melting temperature, depositing a second layer of the first material on the second magnetic member, depositing a first layer of a second material on the first layer of the first material where the second material has a lower melting temperature than the first material, depositing a second layer of the second material on the second layer of the first material, the first material and the second material having properties of forming an alloy when the first and second materials are heated to a particular temperature greater than the melting temperature of the second material and less than the melting temperature of the first material, disposing the first and second magnetic members in contiguous relationship to each other, and heating the first and second magnetic members to the particular temperature greater than the melting temperature of the second material and less than the melting temperature of the first material with the first and second members in contiguous relationship to each other to form the alloy between the first and second materials and to produce a continuous gap between the first and second magnetic members.

3. A method of producing a transducer head for providing a transducing action between the head and a movable medium, including the steps of:

providing first and second magnetic members with a configuration to define a magnetic circuit for disposition of the gap in magnetic proximity to the movable medium to obtain a magnetic coupling between the medium and the first and second members upon a disposition of the first and second members in contiguous relationship to each other and to the movable medium, the gap being defined by the first and second magnetic members in the contiguous disposition of the first and second members relative to each other, depositing layers of a first electrically conductive material on each of the first and second magnetic members where the first electrically conductive material has a relatively high melting temperature, depositing layers of a second electrically conductive material on each of the layers of the first electrically conductive material where the second electrically conductive material has a lower melting temperature than the first electrically conductive material and where the second electrically conductive material forms an alloy with the first electrically conductive material when melted, disposing the first and second magnetic members in contiguous relationship to each other, and melting the second electrically conductive material at a particular temperature below the melting temperature of the first electrically conductive material and above the melting temperature of the second electrically conductive material to form the alloy with the first electrically conductive material and to define a continuous gap between the first and second magnetic members.

4. The method set forth in claim 3 including the steps of: potting the transducer head, at the time of formation of the alloy, with a potting material having a reacting temperature approximately equal to the melting temperature of the second material where the potting material has the properties of solidifying upon being heated to the reacting temperature and where the first and second members are disposed in contiguous relationship to each other.

5. The method set forth in claim 4 in which the first and second electrically conductive materials are respectively gold and indium in eutectic proportions and in the potting material is an epoxy and in which the gold has a thickness of approximately 20 to 23 micro-inches in the layer on each of the first and second magnetic members and the indium has a thickness of 7 to 14 micro-inches in the layer on each of the first and second members.

6. The method set forth in claim 1 wherein the first and second layers are electrically conductive.

7. The method set forth in claim 1 wherein the first and second magnetic members are disposed in a casing and are potted in a material having a reacting temperature approximately equal to the particular temperature to which the first and second magnetic members are heated after the layers of the first and second materials have been deposited on the magnetic members and where the potting material becomes hardened at the reacting temperature.

8. The method set forth in claim 1 wherein the first and second materials are respectively gold and indium in eutectic proportions.

9. The method set forth in claim 6 wherein the first and second materials are electrically conductive.

10. The method set forth in claim 6 wherein the first and second materials are electrically conductive and have the properties of forming a eutectic at the particular temperature.

11. The method set forth in claim 10 wherein the first and second layers of the first material are deposited with a greater thickness than the first and second layers of the second material.

12. The method set forth in claim 11 wherein the first and second members are disposed in a casing in contiguous relationship to each other and wherein the casing is potted, at the same time that the alloy is formed from the first and second materials, with a material having a melting temperature approximately equal to the particular temperature to which the first and second magnetic members are heated after the first and second materials have been deposited on the magnetic members.

13. The method set forth in claim 4 wherein the first and second electrically conductive materials form a eutectic at the particular temperature to which the first and second magnetic members are heated after the first and second materials have been deposited on the magnetic members.

14. The method set forth in claim 13 wherein the layers of the first electrically conductive material have greater thicknesses than the layers of the second electrically conductive material.

References Cited by the Examiner

UNITED STATES PATENTS

| | | | |
|---|---|---|---|
| 2,001,186 | 5/1935 | Dornier. | |
| 2,492,162 | 12/1949 | Litton | 29—471.9 |
| 2,674,031 | 4/1954 | Buhrendorf | 29—155.57 |
| 2,674,659 | 4/1954 | Buhrendorf | 179—100.2 |
| 2,676,392 | 4/1954 | Buhrendorf | 29—155.58 |
| 2,677,019 | 5/1954 | Buhrendorf | 179—100.2 |
| 2,786,897 | 3/1957 | Schwarz | 179—100.2 |
| 2,798,843 | 7/1957 | Slomin et al. | |
| 2,800,534 | 7/1957 | Bradford et al. | 179—100.2 |
| 2,850,582 | 9/1958 | Raemy | 179—100.2 |
| 2,866,011 | 12/1958 | Kornei | 179—100.2 |
| 2,866,013 | 12/1958 | Reis | 179—100.2 |
| 2,919,312 | 12/1959 | Rosenberger | 179—100.2 |
| 2,933,565 | 4/1960 | Neumann | 179—100.2 |
| 3,004,325 | 10/1961 | Kornei | 179—100.2 X |
| 3,019,303 | 1/1962 | Bauer et al. | 179—100.2 |
| 3,047,674 | 7/1962 | Keskinen | 179—100.2 |
| 3,052,957 | 9/1962 | Swanson | 29—487 X |
| 3,076,260 | 2/1963 | Roehl | 29—502 X |
| 3,079,470 | 2/1963 | Camras | 179—100.2 |
| 3,098,126 | 7/1963 | Kaspaul | 179—100.2 |
| 3,141,238 | 7/1964 | Harman | 29—498 |

FOREIGN PATENTS

| | | |
|---|---|---|
| 622,071 | 4/1949 | Great Britain. |

JOHN F. CAMPBELL, *Primary Examiner.*

ELI J. SAX, *Examiner.*